(12) United States Patent
Ohsawa (10) Patent No.: US 6,424,805 B2
(45) Date of Patent: Jul. 23, 2002

(54) EXPOSURE CONTROL DEVICE FOR USE IN CAMERA

(75) Inventor: Toshifumi Ohsawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/866,588

(22) Filed: May 30, 2001

(30) Foreign Application Priority Data

Jun. 14, 2000 (JP) ........................................ 2000-178223

(51) Int. Cl.$^7$ ................................................. G03B 7/08
(52) U.S. Cl. ............................ 396/50; 396/67; 396/234
(58) Field of Search ............................. 396/65, 67, 50, 396/233, 234

(56) References Cited

U.S. PATENT DOCUMENTS

| | | | |
|---|---|---|---|
| 4,897,807 A | 1/1990 | Ohsawa | 364/707 |
| 4,970,412 A | 11/1990 | Jarrett | 307/363 |
| 4,974,013 A | 11/1990 | Ohsawa | 354/475 |
| 5,107,290 A | 4/1992 | Ohsawa | 354/173 |
| 5,557,365 A | 9/1996 | Ohsawa | 354/484 |
| 5,596,387 A | 1/1997 | Takagi | 396/50 |
| 5,839,001 A | 11/1998 | Ohtaka et al. | 396/114 |
| 6,314,241 B1 * | 11/2001 | Matsumura | 396/234 X |

FOREIGN PATENT DOCUMENTS

| | | | |
|---|---|---|---|
| JP | 6-177416 | 6/1994 | H01L/31/10 |
| JP | 9-184965 | 7/1997 | G02B/7/28 |
| JP | 11-190816 | 7/1999 | G02B/7/28 |

* cited by examiner

Primary Examiner—W. B. Perkey
(74) Attorney, Agent, or Firm—Fitzpatrick, Cella, Harper & Scinto (57) ABSTRACT

An exposure control device for use in a camera includes a photosensor having at least two different types of spectral characteristics, a lightness calculating circuit that calculates lightness of each zone of the photosensor from the output of the zone of the photosensor, wherein the photosensor is partitioned into a plurality of zones, a saturation calculating circuit that calculates saturation of each zone of the photosensor from the output of the zone of the photosensor, a cloudy sky determining circuit that determines whether an area of the object field is a cloudy sky area, based on the lightness and saturation of each zone of the photosensor, and an exposure control circuit that performs exposure control based on the determination result of the cloudy sky determining circuit.

26 Claims, 9 Drawing Sheets

| V | IR | V | IR | V | IR | V | IR | V |
|---|----|---|----|---|----|---|----|---|
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |
| V | IR | V | IR | V | IR | V | IR | V |

EXPOSURE CONTROL DEVICE FOR USE IN CAMERA

BACKGROUND OF THE INVENTION

1. Field of the Invention

The present invention relates to an exposure control device for use in a camera and, more particularly, to an exposure control device that reliably controls exposure even under cloudy weather conditions.

2. Description of the Related Art

In a known technique to achieve an optimum exposure in a camera, an exposure control device photometers a photographic object with a photometric sensor having a plurality of photosensitive elements and determines whether the photographic object is positioned in a back lighting condition based on a plurality of luminance signals output by the photometric sensor. U.S. Pat. No. 5,596,387 discloses a technique in which improved exposure control is performed by obtaining both luminance information and color temperature information based on the spectral component of the object field, by imparting different spectral characteristics to a plurality of photosensitive elements using a saturated color filter or a complementary color filter. According to U.S. Pat. No. 5,596,387, a photograph which conforms to the image of the time band of photographing in the photographing of an evening scene or a morning scene is produced, by performing exposure control based on the luminance information and the color temperature information of the object field.

To take a nice picture by providing an appropriate exposure in outdoor photographing, weather conditions need to be considered. As already discussed, a technique is known which achieves an appropriate exposure by determining front lighting or back lighting during good weather conditions. In contrast, no technique has been available to provide optimum exposure during cloudy weather conditions.

Specifically, a difference between good weather conditions and cloudy weather conditions is discussed. During good weather conditions under which a luminance of Bv≈9 results with a 18% gray reflective plate photometered in the back lighting, a luminance Bv≈8 to 9 results when the luminance of a blue sky portion of the sky is measured at a high elevation angle. A luminance of Bv≈9 to 10 results when the luminance of a white portion of the sky is measured at a low elevation angle. It is said that the luminance of an object is appropriately obtained if the 18% gray reflective plate is photometered. Even if sky appears in the object field, the difference between the luminance of the sky and the luminance of the 18% gray reflective plate is about one notch in the Bv value, and the exposure of the object is not largely in error as long as the photographing is not performed in the back lighting.

When the luminance of a uniformly light gray sky portion is photometered under a cloudy weather condition, a luminance of Bv≈10 results. In contrast, a luminance Bv≈6 to 7 results when the 18% gray reflective plate is photometered. In this case, the luminance difference between the sky portion and an ordinary object portion is three in the Bv value. When the sky portion appears in the object field during cloudy weather, the output of the photometric sensor of a camera is strongly affected by a high luminance of the sky portion. As a result, the object is subject to an underexposure under the cloudy weather condition in contrast to good weather conditions. There is room for improvements in exposure control.

SUMMARY OF THE INVENTION

In accordance with the method of the present invention, an area having high lightness and low saturation is determined, and the area is then determined to be a cloudy sky area when an object range in the area is distant and when the area is on the side of the sky in the object field. Exposure control is performed in such a manner that the luminance of the area determined to be a cloudy sky area is weighted for a smaller value. In this way, under-exposure is avoided when photographing under a cloudy weather condition featuring high lightness and low saturation.

An area is determined to be a cloudy sky area on condition that an area results in a large visible-light luminance, that the object range in the area is distant, and that the area is present on the side of the sky in the object field. Since the luminance of the determined cloudy sky area is weighted for a smaller value in exposure control, under-exposure is prevented when photographing under a cloudy weather featuring a low saturation and a high luminance.

The present invention in one aspect relates to an exposure control device for use in a camera, and includes a photosensor having at least two different types of spectral characteristics, a lightness calculating circuit that calculates a lightness of each zone of the photosensor from the output of the zone of the photosensor, the photosensor being partitioned into a plurality of zones, a saturation calculating circuit that calculates saturation of each zone of the photosensor from the output of the zone of the photosensor, a cloudy sky determining circuit that determines whether an area of the object field is a cloudy sky area, based on the lightness and the saturation of each zone of the photosensor, and an exposure control circuit that performs exposure control based on the determination result of the cloudy sky determining circuit.

The present invention in another aspect relates to an exposure control device for use in a camera, and includes a photosensor having at least two different types of spectral characteristics, a range finder unit that measures a range to an object, a posture detector unit that detects a posture of the body of the camera, a lightness calculating circuit that calculates lightness of each zone of the photosensor from the output of the zone of the photosensor, the photosensor being partitioned into a plurality of zones, a saturation calculating circuit that calculates saturation of each zone of the photosensor from the output of the zone of the photosensor, a particular area determining circuit that determines whether an area of the object field is a particular area, based on the lightness and the saturation of each zone, a cloudy sky determining circuit that determines whether the particular area is a cloudy sky area, based on the range to the object and the posture of the camera, and an exposure control circuit that performs exposure control based on the determination result of the cloudy sky determining circuit.

The present invention in yet another aspect relates to an exposure control device for use in a camera, and includes a photosensor having at least two different types of spectral characteristics, a range finder unit that measures a range to an object, a posture detector unit that detects a posture of the body of the camera, a lightness calculating circuit that calculates lightness of each zone of the photosensor from the output of the zone of the photosensor, the photosensor being partitioned into a plurality of zones, a saturation calculating circuit that calculates saturation of each zone of the photosensor from the output of the zone of the photosensor, a particular area determining circuit that determines whether an area of the object field is a particular area having a lightness thereof higher than a lightness reference value and a saturation thereof lower than a saturation reference value, a cloudy sky determining circuit that determines that the particular area is a cloudy sky area when the range of an object in the particular area is distant, and when the particular area is present on the side of the sky in the object field, based on the outputs of the range finder unit and the posture detector unit, an optimum luminance calculating circuit that calculates an optimum luminance for exposure in accordance with the area size of the cloudy sky area in the object field, and an exposure control circuit that performs exposure control using the calculated optimum luminance.

The present invention in still another aspect relates to an exposure control device for use in a camera, and includes a photosensor having spectral characteristics in the visible-light region and in the infrared-light region, a visible-light luminance calculating circuit that calculates visible-light luminance in each zone of the photosensor from the output of the zone of the photosensor, the photosensor being partitioned into a plurality of zones, an infrared-light luminance calculating circuit that calculates infrared-light luminance in each zone of the photosensor from the output of the zone of the photosensor, a cloudy sky determining circuit that determines whether an area of the object field is a cloudy sky area, based on the visible-light luminance and the infrared-light luminance in each zone, and an exposure control circuit that performs exposure control based on the determination result of the cloudy sky determining circuit.

The present invention in still another aspect relates to an exposure control device for use in a camera, and includes a photosensor having spectral characteristics in the visible-light region and in the infrared-light region, a range finder unit that measures a range to an object, a posture detector unit that detects a posture of the body of the camera, a visible-light luminance calculating circuit that calculates visible-light luminance in each zone of the photosensor from the output of the zone of the photosensor, the photosensor being partitioned into a plurality of zones, an infrared-light luminance calculating circuit that calculates infrared-light luminance in each zone of the photosensor from the output of the zone of the photosensor, a sky area determining circuit that determines whether an area of the object field is a sky area, based on the visible-light luminance and the infrared-light luminance in the zone and the posture of the body of the camera, a cloudy sky determining circuit that determines whether a sky area is a cloudy sky area, based on a value of the ratio of the visible-light luminance to the infrared-light luminance, and an exposure control circuit that performs exposure control based on a determination result of the cloudy sky determining circuit.

The present invention in yet another aspect relates to an exposure control device for use in a camera, and includes a photosensor having spectral characteristics in the visible-light region and in the infrared-light region, a range finder unit that measures a range to an object, a posture detector unit that detects a posture of the body of the camera, a visible-light luminance calculating circuit that calculates visible-light luminance in each zone of the photosensor from the output of the zone of the photosensor, the photosensor being partitioned into a plurality of zones, an infrared-light luminance calculating circuit that calculates infrared-light luminance in each zone of the photosensor from the output of the zone of the photosensor, a sky area determining circuit that determines whether an area is a sky area where the visible-light luminance is higher than a reference value, the range of the object is distant, and the area is on the sky side in the range of the object field, a cloudy sky determining circuit that determines whether a sky area is a cloudy sky area where the infrared-light luminance is higher than the visible-light luminance in ratio, an optimum luminance calculating circuit that calculates an optimum luminance for exposure in accordance with an area size of the cloudy sky area in the object field, and an exposure control circuit that performs exposure control using the calculated optimum luminance.

Further objects, features, and advantages of the present invention will be apparent from the following description of the preferred embodiments with reference to the attached drawings.

DESCRIPTION OF THE PREFERRED EMBODIMENTS

First Embodiment

Figure 1:
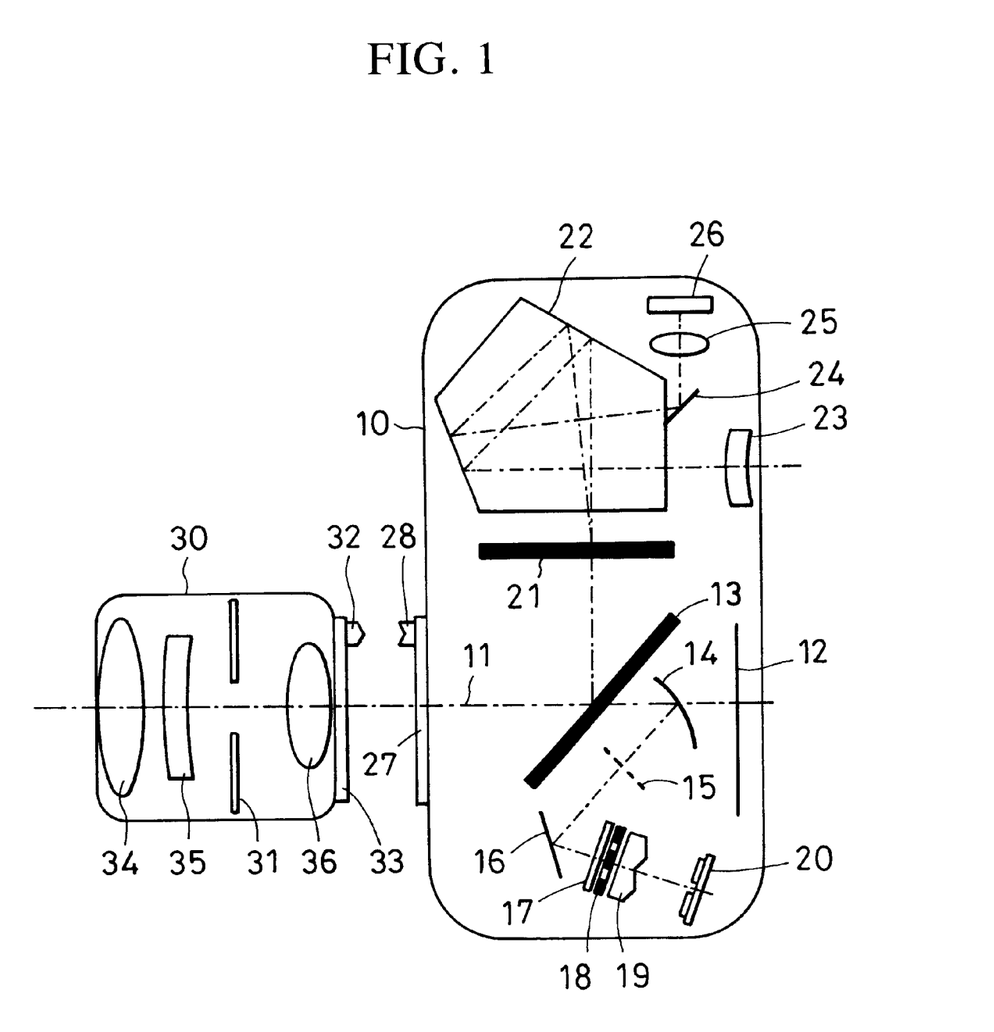
FIG. 1 is a cross-sectional view showing the layout of optical elements of a camera and an interchangeable lens.

FIG. 1 is a sectional view showing the layout of optical members in a camera and interchangeable lens of the present invention.

Figure 2:
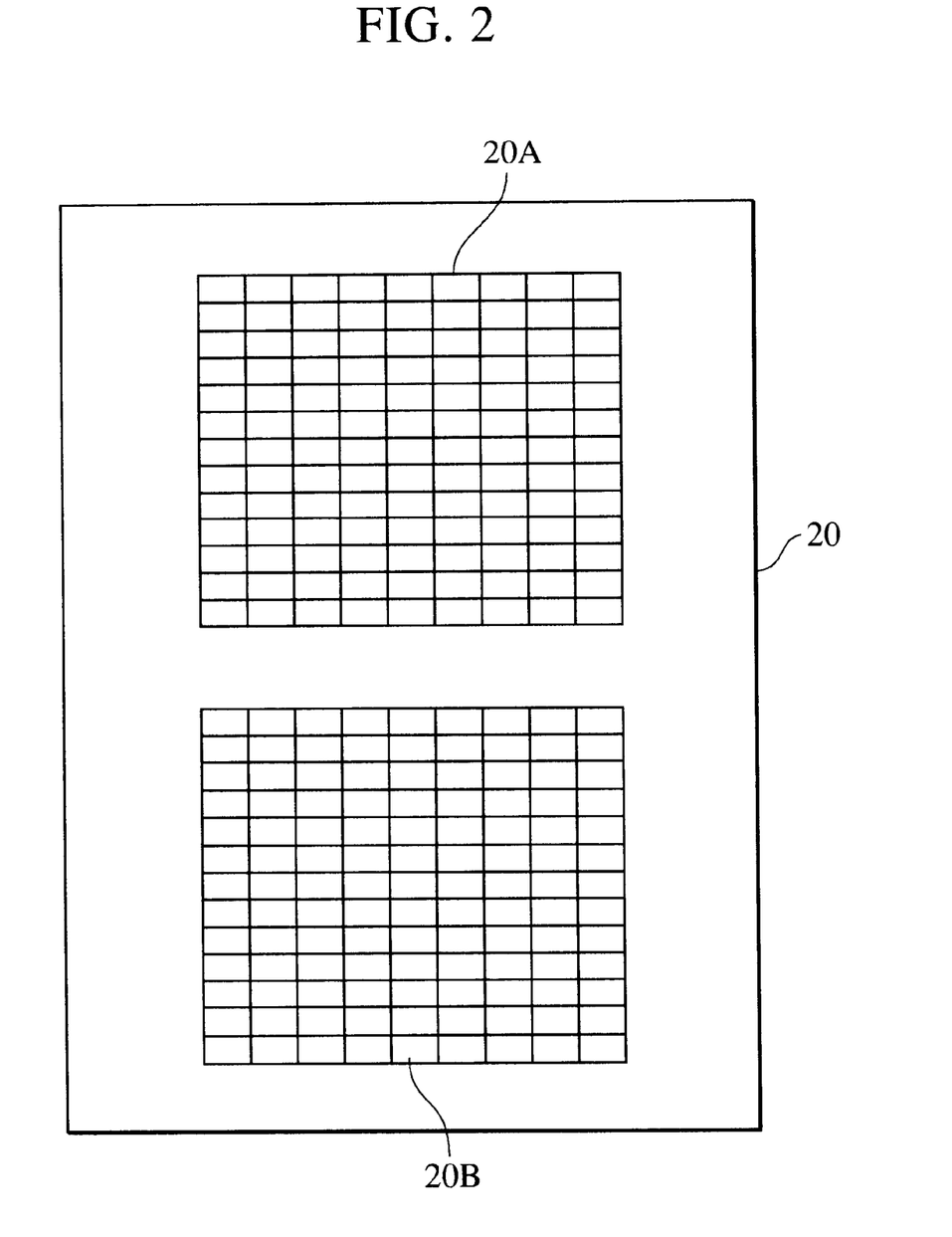
FIG. 2 shows the structure of a focus detection sensor.

As shown, a single-lens reflex camera with an interchangeable lens includes a camera body 10, and an interchangeable lens 30. There are shown, in the camera body 10, an optical axis 11 of an imaging lens, a film plane 12, a semi-transmissive main mirror 13, and a first reflective mirror 14. Both the main mirror 13 and the first reflective mirror 14 are flipped up and down during photographing operations, as is well known in the art. Also shown are a paraxial imaging plane 15, which is optically conjugate with the film plane 12 with respect to the first reflective mirror 14, a second reflective mirror 16, an infrared blocking filter 17, a diaphragm 18 having two apertures, a secondary imaging lens 19, and a focus detection sensor 20. The focus detection sensor 20 is fabricated of an area storage type photoelectric conversion element such as a CMOS or CCD, and includes a number of photosensors divided into a pair of zones 20A and 20B corresponding to the two apertures of the diaphragm 18 as shown in FIG. 2. Together with the photosensors (including zones 20A and 20B), a signal storage unit and a peripheral circuit for signal processing are integrated into a single chip. The construction from the first reflective mirror 14 to the focus detection sensor (AF sensor) 20 enables focus detection using an image shifting method at any location within the object field, e.g., as disclosed in detail in Japanese Patent Laid-Open No. 9-184965.

Figure 3:
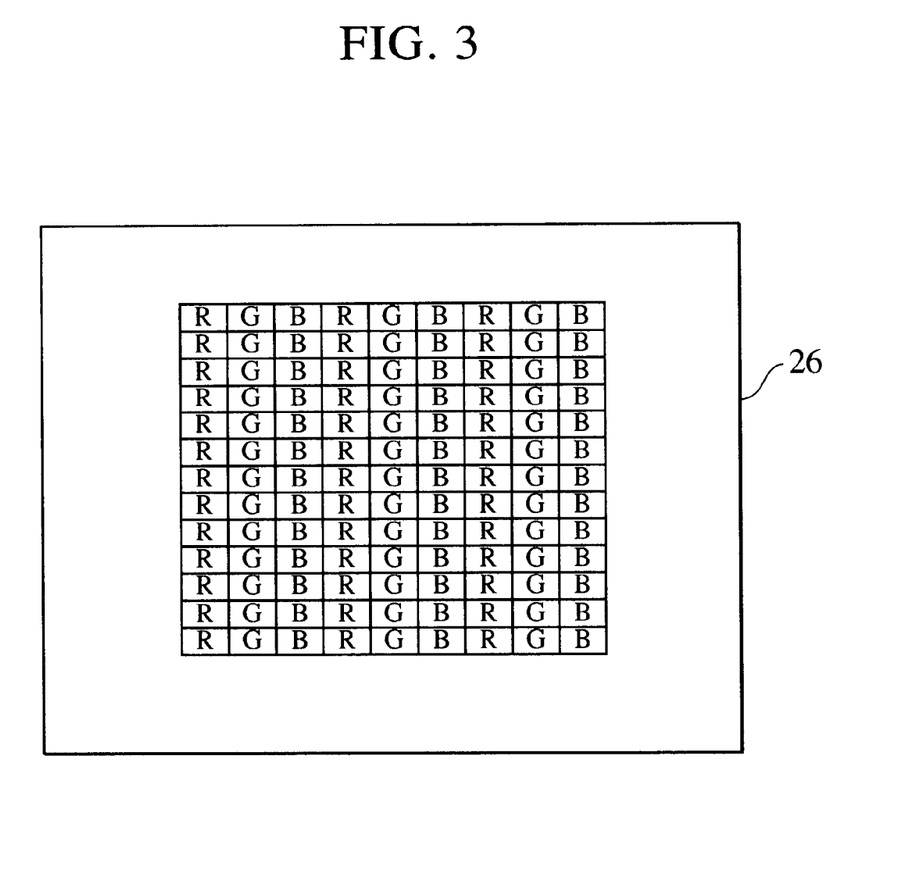
FIG. 3 shows the structure of a photometric sensor in a first embodiment of the present invention.

Also shown are a focusing plate 21 having a diffusion characteristic (diffusivity), a penta prism 22, an eyepiece 23, a third reflective mirror 24, a condenser lens 25, and a photometric sensor (AE sensor) 26 for collecting information about the luminance and color of an object. The photometric sensor 26 is an area storage type photoelectric conversion device, such as a CMOS or CCD, and is composed a number of photosensor elements and a color filter having spectral characteristics of the primary colors (or the complementary colors), in an arrangement as shown in FIG. 3. The photometric sensor 26 substantially covers the entire object field. FIG. 3 shows an example of the color filter having the primary color spectral characteristics, in which R represents a zone of the photosensor provided with a color filter having red transmissive spectral characteristic, G represents a zone of the photosensor provided with a color filter having green transmissive spectral characteristic, and B represents a zone of the photosensor provided with a color filter having blue transmissive spectral characteristic. In the same manner as in the focus detection sensor, a signal storage unit and a peripheral circuit for signal processing are integrated together with the photosensor into a single chip. Further shown in FIG. 1 are a lens mount 27 for mounting the (interchangeable) imaging lens and a junction 28 for establishing communication with the imaging lens.

The interchangeable lens 30 includes a diaphragm 31, a junction 32 for establishing communication with the camera body, a mount 33 to be mated with the camera, and optical lens elements 34 to 36 forming the imaging lens.

Figure 4:
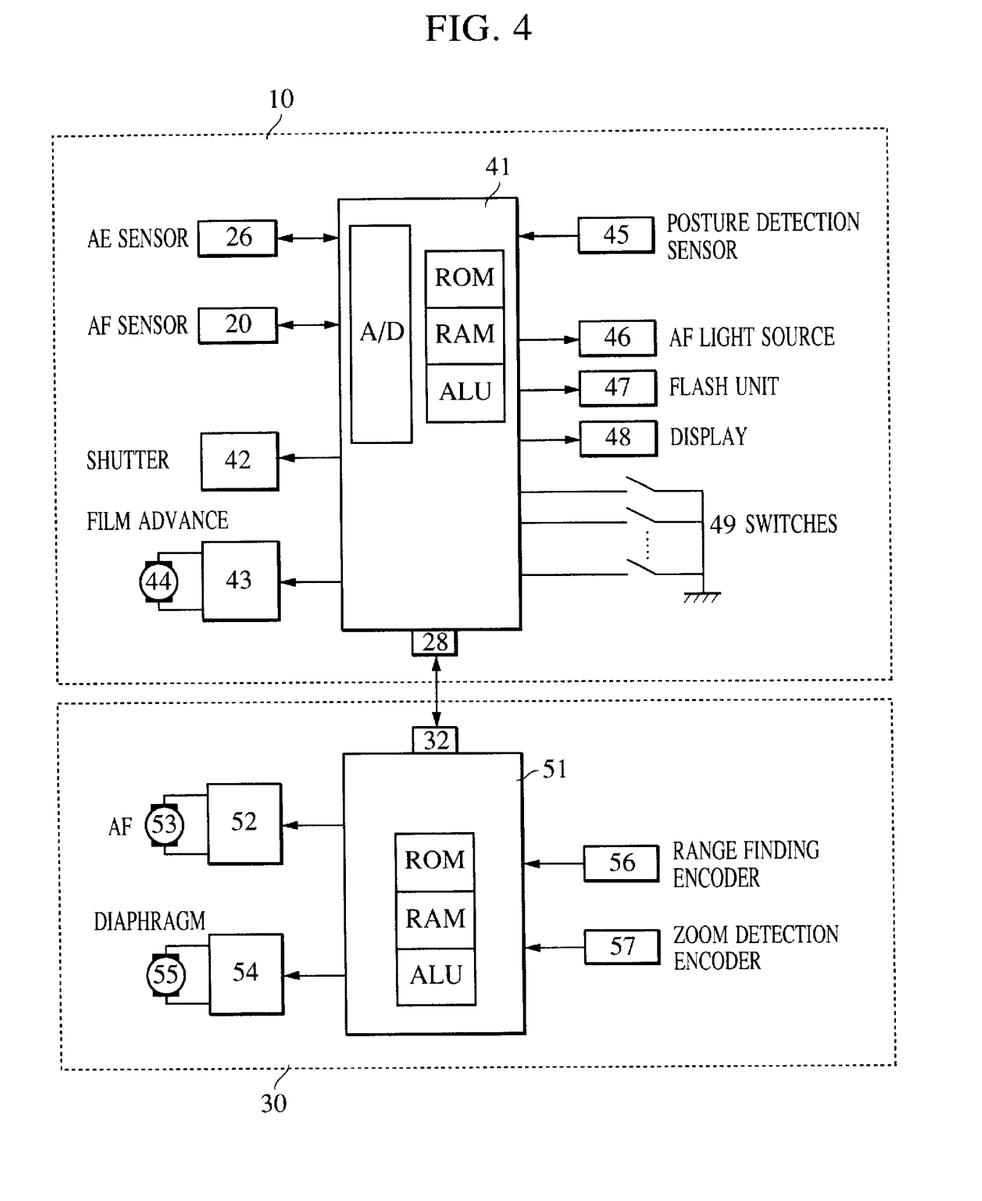
FIG. 4 is a block diagram showing an electrical circuit for the camera and the interchangeable lens.

FIG. 4 is a block diagram showing the electrical circuit of the camera body 10 of the present invention and the interchangeable lens 30. In the camera body 10, a control circuit 41 is a one-chip microcomputer including a ROM (Read-Only Memory), a RAM (Random-Access Memory), an ALU (Arithmetic and Logic Unit), an analog-to-digital converter, and a serial communication port, and generally controls operation of the camera mechanism. The control operation sequence of the control circuit 41 will be specifically discussed later. The focus detection sensor 20 and the photometric sensor 26 here are those described with reference to FIG. 1. The outputs of the focus detection sensor 20 and the photometric sensor 26 are connected to inputs of the analog-to-digital converter of the control circuit 41. A shutter 42 is connected to output terminals of the control circuit 41 and is controlled by the control circuit 41. A first motor driver 43 is connected to output terminals of the control circuit 41 and is controlled by the control circuit 41. The first motor driver 43 drives a first motor 44 to advance the film and to drive the main mirror 13. A posture detection sensor 45 detects the posture of the camera, and provides the output thereof to an input terminal of the control circuit 41. Upon receiving information from the posture detection sensor 45, the control circuit 41 collects the information and determines whether a user is holding the camera in a particular orientation, e.g., in a side down position or an upright position during photographing. An AF (auto-focus) light source 46 projects infrared light toward an object when the focus detection sensor 20 detects focus under a low illuminance condition. The AF light source 46 emits light in response to an output signal of the control circuit 41. A flash unit 47 projects light during photographing when the luminance of the object is not sufficient. The flash unit 47 flashes light in response to an output signal from the control circuit 41. A display 48 displays data, e.g., the number of pictures taken, date information, and photographing information. The segments of the display 48 are lit in response to an output signal from the control circuit 41. A plurality of switches 49 including a release button are arranged. The junction 28, already discussed with reference to FIG. 1, exchanges input/output signals with the control circuit 41 through the serial communication port.

In the interchangeable lens 30, a lens control circuit 51 is a one-chip microcomputer including a ROM, a RAM, an ALU, and a serial communication port. A second motor driver 52 is connected to an output terminal of the lens control circuit 51 and is controlled by the lens control circuit 51. The second motor driver 52 drives a second motor 53 to adjust focusing. A third motor driver 54 is connected to an output terminal of the lens control circuit 51 and is controlled by the lens control circuit 51. The third motor driver 54 drives a third motor 55 to control the diaphragm 31 shown in FIG. 1. A range finding encoder 56 is connected to an input terminal of the lens control circuit 51 and acquires information about the projection of a focus adjusting lens, namely, the range to the object. A zoom detection encoder 57 is connected to an input terminal of the lens control circuit 51 and acquires focal length information during photographing when the interchangeable lens 30 is a zoom lens. The junction 32, already described with reference to FIG. 1, exchanges input/output signals with the lens control circuit 51 through the serial communication port.

When the interchangeable lens 30 is mounted onto the camera body 10, the junctions 28 and 32 are mated to each other, allowing data communication to be performed between the lens control circuit 51 and the control circuit 41 of the camera body 10. The lens control circuit 51 outputs, in the data communication to the control circuit 41 of the camera body 10, optical information unique to the individual lens required to perform focus detection and exposure calculation, and the information about the range to the object and the focal length information provided by the range finding encoder 56 and the zoom detection encoder 57. Conversely, the control circuit 41 of the camera body 10 outputs information in the data communication to the lens control circuit 51 to control the second motor driver 52 in accordance with focus adjustment information, and controls the third motor driver 54 in accordance with diaphragm information.

The control sequence of the control circuit 41 of the camera body 10 of the present invention is now discussed with reference to a flow diagram shown in FIG. 5. When a power switch (not shown) is pressed ("on"), the control circuit 41 becomes operative. The sequence begins with step 101 shown in FIG. 5 in response to the pressing of a first stroke switch of a release button (not shown).

In step 101, a control signal is output to the focus detection sensor 20 to start signal storage.

In step 102, the control circuit 41 waits until the focus detection sensor 20 completes the signal storage.

In step 103, the control circuit 41 analog-to-digital converts the stored signal while reading the stored signal from the focus detection sensor 20. The control circuit 41 performs various data corrections, such as shading, on the read digital data.

In step 104, the control circuit 41 receives lens information required to perform focus detection from the lens control circuit 51, and then calculates the focus state in each zone of the object field from the digital data from the focus detection sensor 20. In accordance with the resulting focus state in each zone of the object field, an area within the field to be focused is determined using the technique disclosed in Japanese Patent Laid-Open No. 11-190816. The lens travel distance for focusing is calculated taking into consideration the focus state in the determined zone.

In step 105, the lens travel distance calculated is output to the lens control circuit 51. In response, the lens control circuit 51 outputs a signal to the second motor driver 52 to drive the second motor 53, thereby driving the focus adjusting lens. The imaging lens is thus focused on the object. After focusing the imaging lens on the object, the control circuit 41 acquires information about the range to the object by receiving information from the range finding encoder 56 through the lens control circuit 51.

In step 106, the control circuit 41 outputs a control signal to the photometric sensor 26, thereby starting signal storage.

In step 107, the control circuit 41 waits until the signal storage is complete.

In step 108, the control circuit 41 analog-to-digital converts the stored signal while reading the signal stored in the photometric sensor 26.

In step 109, an exposure calculation is performed. The control circuit 41 determines the luminance of the object through calculation, and determines a shutter speed and a diaphragm stop resulting in an optimum exposure. The control circuit 41 also determines whether to flash light. The calculation process will be detailed later referring to a flow diagram shown in FIG. 6.

In step 110, the control circuit 41 waits until a second stroke switch of the shutter button is turned on. If the second stroke switch is not turned on, the control sequence returns to step 101. If (when) the second stroke switch is turned on, the control sequence goes to step 111.

In step 111, the control circuit 41 outputs a control signal to the first motor driver 43 to drive the first motor 44, thereby flipping up the main mirror 13 and the first reflective mirror 14.

In step 112, the control circuit 41 outputs the diaphragm stop information calculated in step 109 to the lens control circuit 51. In response to this information, the lens control circuit 51 outputs a control signal to the third motor driver 54 to drive the third motor 55, thereby driving the diaphragm 31. In this way, the imaging lens is put into a stopped-down aperture state.

In step 113, the control circuit 41 controls the shutter 42 in accordance with the shutter speed calculated in step 109, thereby exposing the film to a photographic scene. The flash unit 47 is triggered, as necessary.

In step 114, the control circuit 41 outputs information to the lens control circuit 51 to open the diaphragm 31. In response to this information, the lens control circuit 51 outputs a signal to the third motor driver 54 to drive the third motor 55, thereby driving the diaphragm 31. The imaging lens is thus put to an open diaphragm state.

In step 115, the control circuit 41 outputs a control signal to the first motor driver 43 to drive the first motor 44, thereby flipping down the main mirror 13 and the first reflective mirror 14.

In step 116, the control circuit 41 outputs a control signal to the first motor driver 43 to drive the first motor 44, thereby winding up the film.

A series of photographing steps is thus completed.

Figure 6:
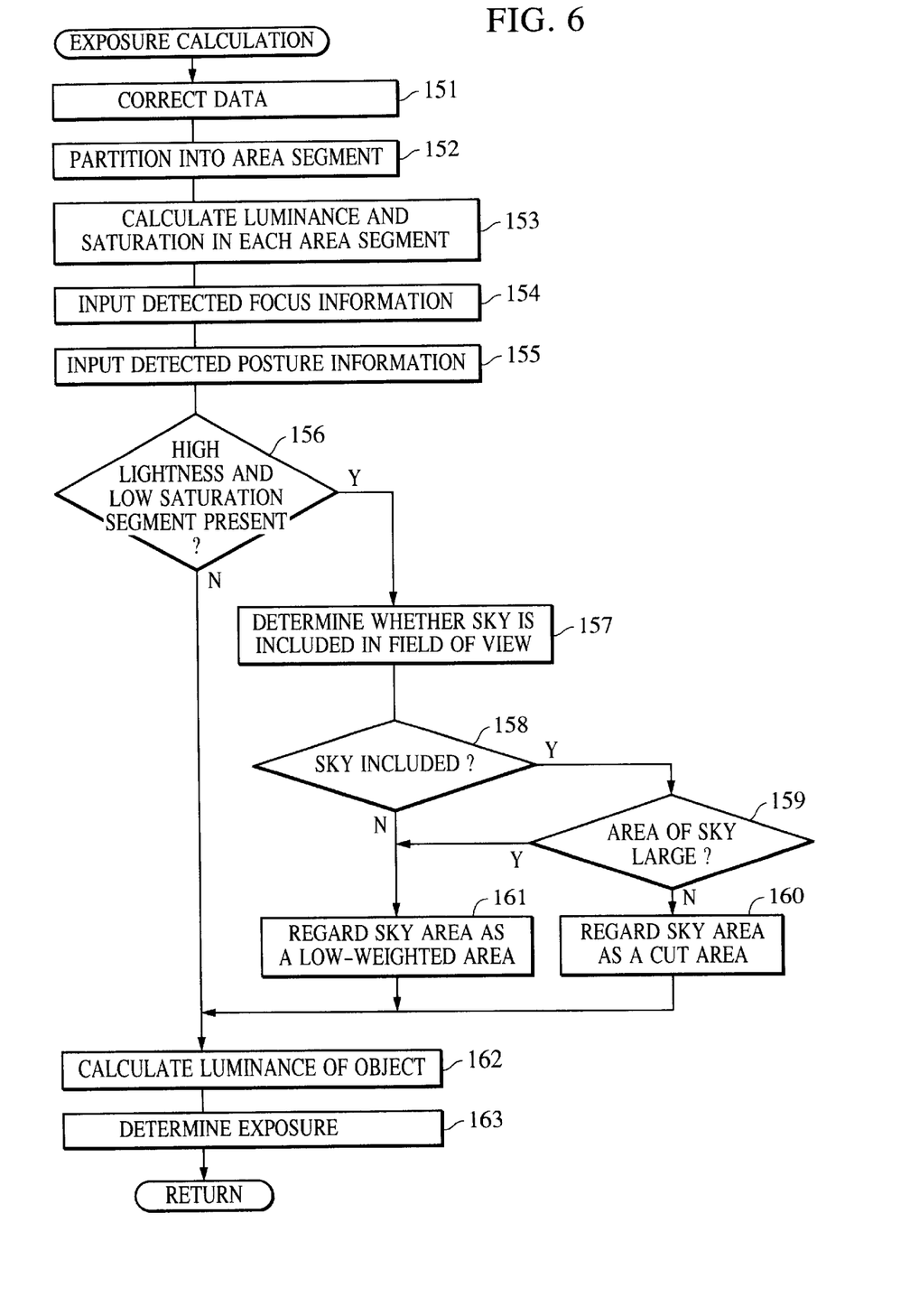
FIG. 6 is a flow diagram showing an exposure calculation in the first embodiment of the present invention.

The exposure calculation executed in step 109 is now discussed in detail, referring to the flow diagram shown in FIG. 6.

Figure 5:
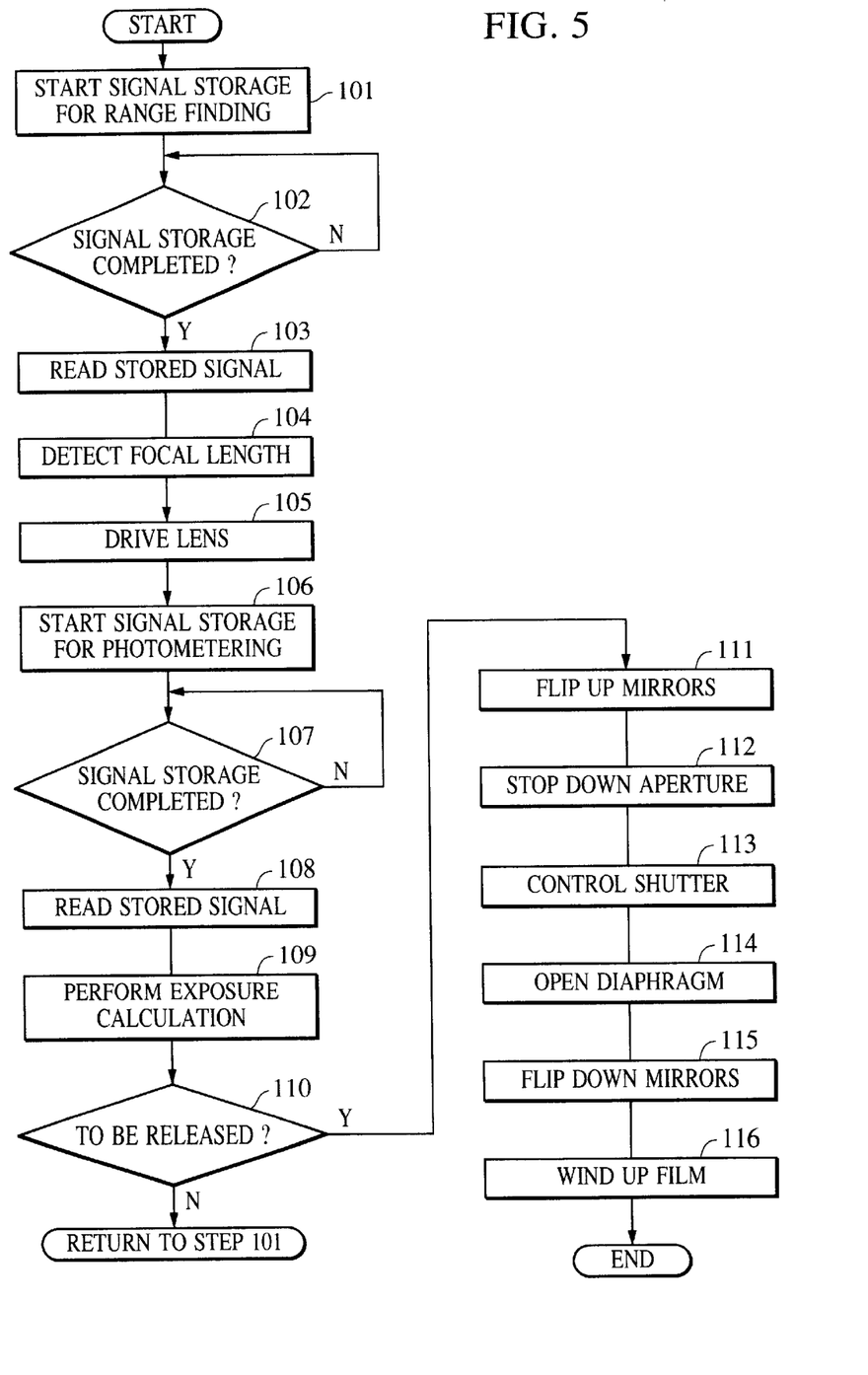
FIG. 5 is a flow diagram showing operation of the control circuit of the camera.

In step 151, the control circuit 41 receives lens and other information required to perform the exposure calculation from the lens control circuit 51, and corrects the digital data derived from the photometric sensor 26 in step 108 shown in FIG. 5.

In step 152, the control circuit 41 groups the corrected digital data according to the zones. For example, adjacent photosensors, each having R, G, and B color filters, are combined as a group, and each four adjacent groups are treated as one zone. The object field is thus partitioned into zones.

In step 153, the average values of R, G, and B in each zone are calculated, and are then regarded as luminance data r, g, and b for each zone. The luminance data r, g, and b is then subjected to a matrix operation for color space alteration and is thus converted into lightness L, hue H, and saturation S. The conversion equations are as follows:

$L = 7.3r + 7.59g + 7.11b$ $c1 = 7.7r - 7.59g - 7.11b$ $c2 = -7.3r - 7.59g + 7.89b$ $H = \tan^{-1}(c1, c2)$ $S = \sqrt{(c1^2 + c2^2)}$ In step 154, focus information, namely, the object range of the in-focus zone obtained in steps 104 and 105 in FIG. 5, and information about the relative range of each zone to the relative object ranges of each zone are related in correspondence to the zones partitioned in step 152. In this way, the control circuit 41 acquires the information of whether the camera is far from (distant) or near to (close) the zones of the object field.

In step 155, the control circuit 41 receives information from the posture detection sensor 45. The control circuit 41 thus acquires information of whether the camera is being held in a particular orientation, e.g., in a side down position or an upright position, and thereby determines the orientation of the camera in the object field with respect to the sky and ground perspective.

In step 156, the control circuit 41 determines whether an area having a lightness L thereof higher than a predetermined value and a saturation S thereof lower than a predetermined value is presented, based on the lightness L and the saturation S obtained in step 153 for each zone. If an area satisfying such a condition is present, the control sequence proceeds to step 157.

In step 157, the control circuit 41 determines whether a sky area appears in the object field in connection with each of the zones having a lightness L thereof higher than the predetermined value and a saturation S thereof lower than the predetermined value. Used in the determination are criteria as to whether a far range portion is present based on the focus information obtained in step 154, whether the area is on the side of the sky based on the posture information obtained in step 155, and whether there is a continuity from a high-lightness and low-saturation area on the side of the sky in the object field. An area satisfying these criteria is determined to be a sky area.

In step 158, if there exists a zone determined to be a sky area in step 157, the control sequence proceeds to step 159.

In step 159, the control circuit 41 determines whether the ratio of the area size of the area determined to be a sky area to the entire area of the object field is larger than a predetermined value. When it is determined that the ratio is lower than the predetermined value, the control sequence proceeds to step 160.

In step 160, the luminance information of the area determined to be a sky area is not accounted for in the calculation of the object luminance to be discussed later. In other words, the area is treated as a cut area. The control sequence proceeds to step 162. When there is no area determined to be a sky area in step 158, or when the ratio of the area size of the area determined to be a sky area to the entire area of the object field is larger than the predetermined value in step 159, the control sequence proceeds to step 161.

In step 161, the area determined not to be a sky area in step 158 but having a lightness L thereof higher than the predetermined value and a saturation S thereof lower than the predetermined value, and where the sky area is determined to have an area size ratio greater than the predetermined value in step 159 are weighted in luminance thereof with a smaller value compared with the remaining area in the calculation of the object luminance to be discussed later. These areas are thus treated as a low-weighted area. The control sequence then proceeds to step 162. When it is found in step 156 that there is no area having a lightness L thereof higher than the predetermined value and a saturation S thereof lower than the predetermined value, the control sequence proceeds to step 162 without performing steps 157 through 161.

In step 162, the object luminance is calculated based on the information of the lightness L of each zone of the object field. In the calculation, the area on which the camera focuses in step 104 shown in FIG. 5 is weighted with a large value, the data of the area determined to be a cut area in step 160 is not accounted for, and the area weighted with a small value in step 161 is weighted with a small value. The average of these areas is thus determined.

Figure 7:
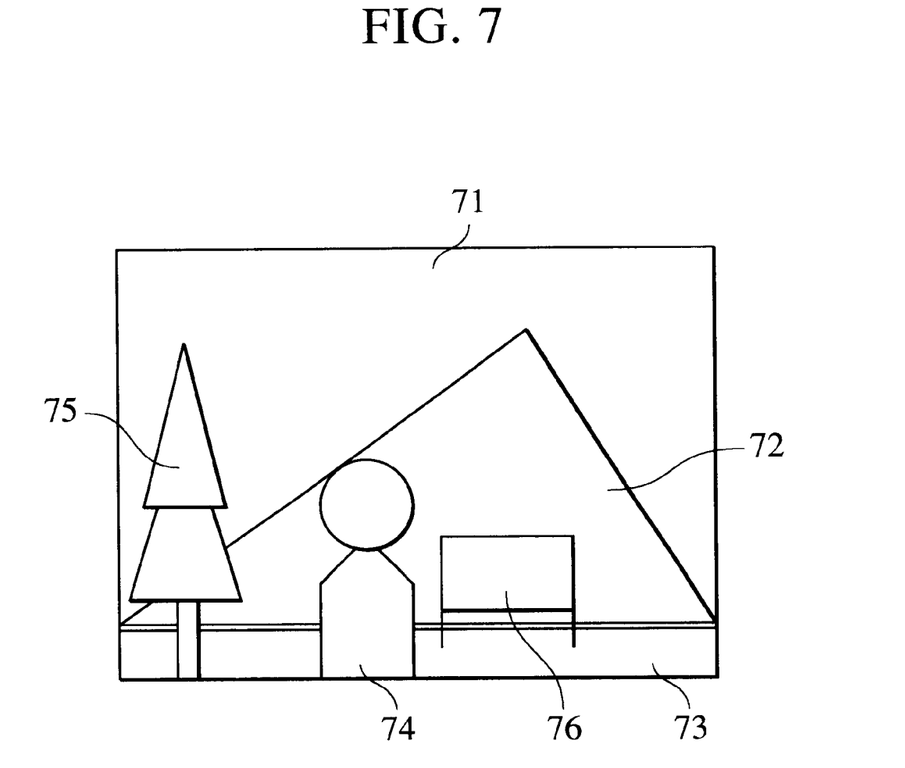
FIG. 7 shows one example of an object field.

A photographic composition shown in FIG. 7 is now discussed. There are shown a sky area 71, a mountain area 72, a ground area 73, a person 74, a tree 75, and a billboard 76. Among these areas, the sky area 71 rises in lightness L in the photographing during the day time. The person 74 and the billboard 76 can have a high lightness L when they have a highly reflective color. The sky area 71 becomes relatively high in saturation S in good weather conditions or in a reddish sky with sunrise glow or sunset glow. On a cloudy day, the saturation S of the cloudy sky area becomes quite low. In step 156, the sky area 71 is thus extracted as an area having a lightness thereof higher than the predetermined value and a saturation S thereof lower than the predetermined value on a cloudy day during daylight photographing. Taking into account the focus information and the posture information, the area is then determined to be a cloudy area in step 157, and is then treated as a cut area in step 160. When the person 74 and the billboard 76 are extracted as an area having a lightness thereof higher than the predetermined value and a saturation S thereof lower than the predetermined value due to the color and the reflectance thereof in step 156, the person 74 is determined to be close (not far) or distant in step 157 and the billboard 76 is determined to be not continuous with the sky area. Both the person 74 and the billboard 76 are determined not to be a sky area, and are weighted with a small value in step 161.

The luminance of the object is calculated from the lightness data of the photographing area excluding the sky area 71 in the photographing on a cloudy day, and is calculated from the lightness data of the photographing area including the sky area 71 on a fine day or under sunrise or sunset glow conditions.

In a photographic composition having the majority of the object field thereof occupied by the sky area, unlike the photographic composition shown in FIG. 7, neglecting the effect of the sky area, even if it is cloudy, in the calculation of the object luminance is inappropriate. For this reason, the sky area is treated as a cut area or is weighted with a small value in step 159, depending on the ratio of the area size of the sky area. Under good weather conditions or sunset glow or sunrise glow conditions, the sky area is neither treated as a cut area nor weighted with a small value because even a high luminance area is not low in saturation.

In step 163, film speed information is added to the calculated object luminance. From the result, a shutter speed and a diaphragm stop resulting in an optimum exposure are determined. When the object luminance is lower than a predetermined value, the control circuit 41 decides to use the flash unit 47. There are available two types of criteria for this decision: a first predetermined luminance value for a normal operation, and a second luminance value in which the control sequence flows from step 158 to step 159, namely, in a photographing operation under a cloudy weather condition. The second predetermined value is higher than the first predetermined value. In other words, the flashing is triggered more easily in a photographing operation under cloudy weather conditions. This is intended to easily take a light hue and high-contrast picture in a photographing operation under a cloudy weather conditions.

The exposure calculation in accordance with the first embodiment has been discussed in detail.

Second Embodiment

In accordance with the first embodiment, the photometric sensor 26 is an area storage type photoelectric conversion element which is partitioned into a number of zones, and is provided with a color filter having primary color spectral characteristics or complementary color spectral characteristics. In accordance with the lightness L information and the saturation S information in the signal from the photometric sensor 26, the cloudy sky area is determined. The present invention is not limited to this arrangement.

A second embodiment employs a photometric sensor 66 instead of the photometric sensor 26 shown in the first embodiment. The rest of the construction of the second embodiment remains unchanged from that shown in FIG. 1 and FIG. 4.

Figure 8:
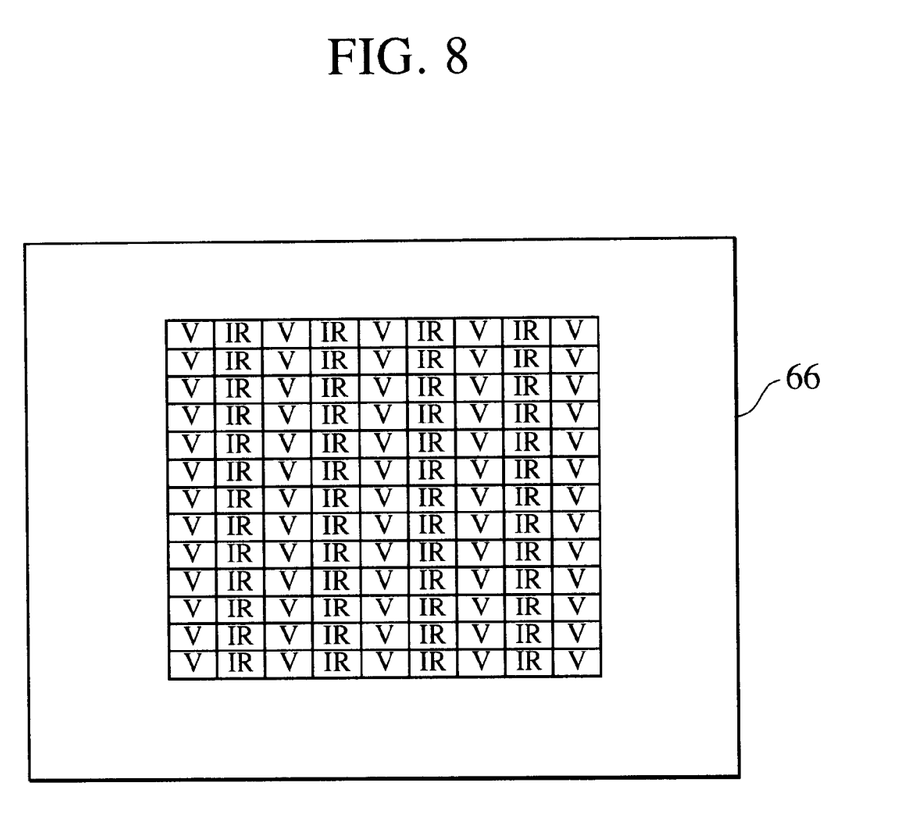
FIG. 8 shows the structure of a photometric sensor in a second embodiment of the present invention.

The photometric sensor 66 is an area storage type photoelectric conversion device such as a CMOS or CCD, and is composed of a number of photosensor elements and a color filter V having visible-light spectral characteristics of the primary colors and a color filter IR having infrared spectral characteristics, as shown in FIG. 8. The photometric sensor 66 substantially covers the entire object field. In the same manner as in the photometric sensor 26, a signal storage unit and a peripheral circuit for signal processing are integrated together with the photosensor 66 into a single chip.

The general control sequence of the second embodiment remains the same as that of the control circuit 41 of the camera in the first embodiment shown in FIG. 5. The exposure calculation executed in step 109 in the second embodiment, different from that shown in FIG. 6, is discussed, referring to a flow diagram shown in FIG. 9.

Figure 9:
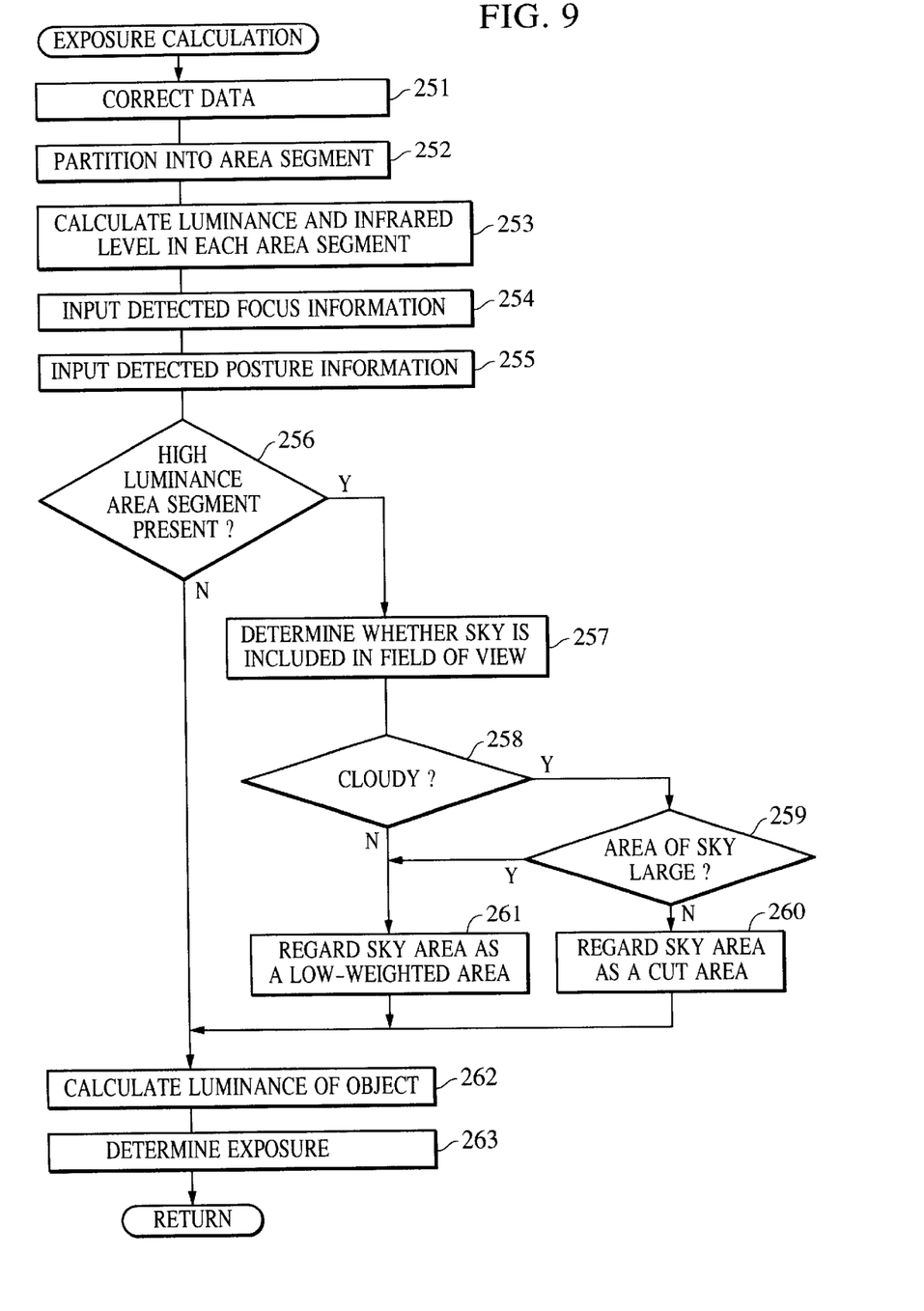
FIG. 9 is a flow diagram of an exposure calculation according to the second embodiment of the present invention.

In step 251, the control circuit 41 receives lens information required to perform exposure calculation from the lens control circuit 51, and corrects digital data from the photometric sensor 66 as in step 108 shown in FIG. 5.

In step 252, the control circuit 41 divides the corrected digital data according to zone. For example, photosensor elements adjacent to each other having a V filter and an IR filter are paired, and every four pairs are grouped into a zone. The object field is thus partitioned into zones.

In step 253, the averages of luminances of the visible-light V and the infrared-light IR are calculated for each zone, and are then treated as luminance data v and luminance data ir for each zone.

In step 254, focus detection information, namely, the object range of the in-focus zone obtained in steps 104 and 105 in FIG. 5, and information about the relative object range of each zone are related in correspondence to the zones partitioned in step 252. In this way, the control circuit 41 acquires the information of whether the camera is far from (distant) or near to (close) the zones of the object field.

In step 255, the control circuit 41 receives information from the posture detection sensor 45. The control circuit 41 thus acquires information of whether the camera is being held in a particular orientation, e.g., in a side down position or an upright position, and thereby determines the orientation of the camera in the object field with respect to the sky and ground perspective.

In step 256, the control circuit 41 determines whether an area obtained in step 253 and having a visible-light luminance data v greater than a predetermined value is present. When it is found that an area satisfies this condition, the control sequence proceeds to step 257.

In step 257, the control circuit 41 determines whether a sky area appears in the object field in connection with each of the areas having a visible-light luminance data v greater the predetermined value. Used in the determination are criteria as to whether a far range portion is present based on the focus information obtained in step 254, whether the area is on the side of the sky based on the posture information obtained in step 255, and whether there is continuity with a high-luminance area on the sky side in the object field. An area satisfying these criteria is determined to be a sky area.

In step 258, if there exists an area determined to be a sky area, a determination is made of whether it is a good weather condition or a cloudy weather condition based on the ratio of the luminance data ir to the luminance data v. As described in Japanese Patent Laid-Open No. 6-177416, there is a greater possibility that the visible-light component is blocked by clouds in a cloudy weather condition than good weather conditions. However, it is known that infrared light having a longer wavelength is blocked less than visible light. When the ratio of the infrared-light data ir to the visible-light data v is higher, it is determined to be cloudy, and the control sequence proceeds to step 259.

In step 259, the control circuit 41 determines whether the ratio of the area size of the area determined to be a sky area to the entire area of the object field is larger than a predetermined value. When it is determined that the ratio is lower than the predetermined value, the control sequence proceeds to step 260.

In step 260, the luminance information of the area determined to be a sky area is not accounted for in the calculation of the object luminance to be discussed later. In other words, the area is treated as a cut area. The control sequence proceeds to step 262. When the ratio of the area size of the area determined to be a sky area to the entire area of the object field is larger than the predetermined value in step 259, or when it is determined to be not cloudy in step 258, the control sequence proceeds to step 261.

In step 261, the area determined not to be a sky area in step 257, the area determined not to be a cloudy area in step 258 but having a luminance data v greater than the predetermined value in step 256, and a sky area having the ratio of the area size thereof to the entire area of the object field determined to be larger than the predetermined value in step 259 are weighted in luminance thereof with a smaller value compared with the remaining area in the calculation of the object luminance to be discussed later. In other words, these areas are treated as low-weighted areas. The control sequence then proceeds to step 262.

When it is determined in step 256 that there is no area having a visible-light luminance data v greater than the predetermined value, the control sequence proceeds to step 262 without performing steps 257 through 261.

In step 262, the object luminance is calculated based on the information of the lightness L of each zone of the object field. In the calculation, the area on which the camera focuses in step 104 shown in FIG. 5 is weighted with a large value, the data of the area determined to be a cut area in step 260 is not accounted for, and the area regarded as a low-weighted area in step 261 is weighted with a small value. The average of these areas is thus determined.

In step 263, film speed information is added to the calculated object luminance. From the result, a shutter speed and a diaphragm stop resulting in an optimum exposure are determined. When the object luminance is lower than a predetermined value, the control circuit 41 decides to use the flash unit 47. There are available two types of criteria for this decision: a first predetermined luminance value for a normal operation, and a second luminance value in which the control sequence flows from step 258 to step 259, namely, in a photographing operation under cloudy weather conditions. The second predetermined value is higher than the first predetermined value. In other words, a flash is triggered more easily in a photographing operation under cloudy weather conditions. This is intended to easily take a light hue and high-contrast picture in a photographing operation under cloudy weather conditions.

The exposure calculation in the second embodiment has been discussed in detail.

In accordance with the above embodiments, a high lightness and low saturation area is detected, using the photometric sensors having red, green and blue spectral characteristics. A cloudy area is detected by determining whether the area is on the sky side of the object field and at a far distance. Under cloudy weather conditions, the detection of a cloudy area enables optimum exposure control. Alternatively, a photometric sensor having visible-light spectral characteristics and infrared-light spectral characteristics is used instead of the photometric sensor having the red, green, and blue spectral characteristics. By determining the ratio of the infrared-light luminance value to the visible-light luminance value, a cloudy area is also detected. Further, optimum exposure control is performed by modifying the weight of these factors depending on the ratio of the particular area to the entire object field. When a particular area is present, the flash unit is triggered more easily, and a light hue and high-contrast photograph is easily obtained in a photographing operation under cloudy weather conditions.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An exposure control device for use in a camera, comprising:
   a photosensor having at least two different types of spectral characteristics, said photosensor being partitioned into a plurality of zones;
   a lightness calculating circuit that calculates a lightness of each zone of the photosensor from an output of the zone of the photosensor;
   a saturation calculating circuit that calculates a saturation of each zone of the photosensor from the output of the zone of the photosensor;
   a cloudy sky determining circuit that determines whether an area of an object field is a cloudy sky area, based on the lightness and saturation of each zone of the photosensor; and an exposure control circuit that performs exposure control based on a determination result of the cloudy sky determining circuit.

2. An exposure control device according to claim 1, wherein the cloudy sky determining circuit determines that an area is a cloudy sky area when a lightness thereof is greater than a lightness reference value and a saturation thereof is less than a saturation reference value.

3. An exposure control device according to claim 1, wherein the exposure control circuit performs exposure control in such a manner that the luminance of a cloudy sky area is weighted with a small value when an area size of the cloudy sky area is sufficiently large relative to an area size of the object field, and in such a manner that the luminance of the cloudy sky area is not accounted for when the area size of the cloudy sky area is sufficiently small relative to the size of the object field.

4. An exposure control device for use in a camera, comprising:
a photosensor having at least two different types of spectral characteristics, said photosensor being partitioned into a plurality of zones;
a range finder unit that measures a range to an object in an object field;
a posture detector unit that detects a posture of a body of the camera;
a lightness calculating circuit that calculates a lightness of each zone of the photosensor from an output of the zone of the photosensor;
a saturation calculating circuit that calculates a saturation of each zone of the photosensor from the output of the zone of the photosensor;
a particular area determining circuit that determines whether an area of the object field is a particular area, based on the lightness and saturation of each zone;
a cloudy sky determining circuit that determines whether a particular area is a cloudy sky area, based on the range to an object and the posture of the camera; and
an exposure control circuit that performs exposure control based on a determination result of the cloudy sky determining circuit.

5. An exposure control device according to claim 4, wherein the particular area determining circuit determines that an area of the object field is a particular area when a lightness thereof is greater than a lightness reference value and a saturation thereof is less than a saturation reference value.

6. An exposure control device according to claim 4, wherein the cloudy sky determining circuit determines that a particular area is a cloudy sky when the range of an object in the particular area is distant, and when the particular area is present on a side of the sky in the object field.

7. An exposure control device according to claim 4, wherein the exposure control circuit performs exposure control in such a manner that the luminance of a cloudy sky area is weighted with a small value when an area size of the cloudy sky area is sufficiently large relative to an area size of the object field, and in such a manner that the luminance of the cloudy sky area is not accounted for when the area size of the cloudy sky area is sufficiently small relative to the area size of the object field.

8. An exposure control device for use in a camera, comprising:
a photosensor having at least two different types of spectral characteristics, said photosensor being partitioned into a plurality of zones;
a range finder unit that measures a range to an object in an object field;
a posture detector unit that detects a posture of a body of the camera;
a lightness calculating circuit that calculates a lightness of each zone of the photosensor from an output of the zone of the photosensor;
a saturation calculating circuit that calculates a saturation of each zone of the photosensor from the output of the zone of the photosensor;
a particular area determining circuit that determines whether an area of the object field is particular area when, a lightness thereof is greater than a lightness reference value and a saturation thereof is less than a saturation reference value;
a cloudy sky determining circuit that determines that a particular is a cloudy sky area when the range of an object in the particular area is distant, and when the particular area is present on a side of the sky in the object field, based on outputs of the range finder unit and the posture detector unit;
an optimum luminance calculating circuit that calculates an optimum luminance for exposure in accordance with an area size of a cloudy sky area in the object field; and
an exposure control circuit that performs exposure control using a calculated optimum luminance.

9. An exposure control device according to claim 8, wherein the cloudy sky determining circuit determines that a particular area is a cloudy sky area when the range of an object in the particular area is greater than a reference value, when the particular area is present on a side of the sky in the object field, and when the particular area has continuity with another particular area.

10. An exposure control device according to claim 8, wherein the optimum luminance calculating circuit calculates the optimum luminance after the luminance of a cloudy sky area is weighted with a small value when the area size of the cloudy sky area in the object field is larger than a reference value.

11. An exposure control device according to claim 8, wherein the optimum luminance calculating circuit calculates the optimum luminance without regard to the luminance of a cloudy sky area when the area size of the cloudy sky area in the object field is not larger than a reference value.

12. An exposure control device according to claim 1, wherein the photosensor has three types of spectral characteristics in the visible light region.

13. An exposure control device according to claim 12, wherein the three types of spectral characteristics are primary colors.

14. An exposure control device according to claim 12, wherein the three types of spectral characteristics are complementary colors.

15. An exposure control device according to claim 12, wherein each zone of the plurality of zones contains each type of the spectral characteristics of the photosensor.

16. An exposure control device for use in a camera, comprising:
a photosensor having spectral characteristics in the visible-light region and in the infrared-light region, said photosensor being partitioned into a plurality of zones;
a visible-light luminance calculating circuit that calculates visible-light luminance in each zone of the photosensor from an output of the zone of the photosensor,;
an infrared-light luminance calculating circuit that calculates infrared-light luminance in each zone of the photosensor from the output of the zone of the photosensor;

a cloudy sky determining circuit that determines whether an area of an object field is a cloud sky area, based on the visible-light luminance and infrared-light luminance in each zone; and an exposure control circuit that performs exposure control based on a determination result of the cloudy sky determining circuit.

17. An exposure control device according to claim 16, wherein the cloudy sky determining circuit determines that an area is a cloudy sky area when the infrared-light luminance is greater than the visible-light luminance in ratio.

18. An exposure control device according to claim 16, wherein the exposure control circuit performs exposure control in such a manner that the luminance of the cloudy sky area is weighted with a small value when an area size of the cloudy sky area is sufficiently large relative to an area size of the object field, and in such a manner that the luminance of the cloudy sky area is not accounted for when the area size of the cloudy sky area is sufficiently small relative to the area size of the object field.

19. An exposure control device for use in a camera, comprising:

a photosensor having spectral characteristics in the visible-light region and in the infrared-light region, said photosensor being partitioned into a plurality of zones;

a range finder unit that measures a range to an object in an object field;

a posture detector unit that detects a posture of a body of the camera;

a visible-light luminance calculating circuit that calculates visible-light luminance in each zone of the photosensor from an output of the zone of the photosensor;

an infrared-light luminance calculating circuit that calculates infrared-light luminance in each zone of the photosensor from the output of the zone of the photosensor;

a sky area determining circuit that determines whether an area of the object field is a sky area, base on the visible-light luminance and infrared-light luminance in the plurality of zones and the posture of the body of the camera;

a cloudy sky determining circuit that determines whether a sky area is a cloudy sky area, based on a value of the ratio of the visible-light luminance to the infrared-light luminance; and an exposure control circuit that performs exposure control based on a determination result of the cloudy sky area.

20. An exposure control device according to claim 19, wherein the sky area determining circuit determines that an area is a sky area when the visible-light luminance is greater than a reference value, the range of the object is distant, and the area is on a side of the sky in the object field.

21. An exposure control device according to claim 19, wherein the cloudy sky determining circuit determines that an area is a cloudy sky area when the infrared-light luminance is greater than the visible-light luminance in ratio.

22. An exposure control device according to claim 19, wherein the exposure control circuit performs exposure control in such a manner that the luminance of a cloudy sky area is weighted with a small value when an area size of a cloudy sky area is sufficiently large relative to an area size of the object field, and in such a manner that the luminance of the cloudy sky area is not accounted for when the area size of the cloudy sky area is sufficiently small relative to the area size of the object field.

23. An exposure control device for use in a camera, comprising:

a photosensor having spectral characteristics in the visible-light region and in the infrared-light region, said photosensor being partitioned into a plurality of zones;

a range finder unit that measures a range to an object in an object field;

a posture detector unit that detects a posture of a body of the camera;

a visible-light luminance calculating circuit that calculates visible-light luminance in each zone of the photosensor from an output of the zone of the photosensor;

an infrared-light luminance calculating circuit that calculates the infrared-light luminance in each zone of the photosensor from the output of the zone of the photosensor;

a sky area determining circuit that determines that an area of the object field is a sky area, when the visible-light luminance is greater than a reference value, the range of the object is distant, and the area is on a side of the sky in the object field;

a cloudy sky determining circuit that determines that a sky area is a cloudy sky area, when the infrared-light luminance is greater than the visible-light luminance in ratio;

an optimum luminance calculating circuit that calculates an optimum luminance for exposure in accordance with an area size of a cloudy sky area in the object field; and an exposure control circuit that performs exposure control using a calculated optimum luminance.

24. An exposure control device according to claim 23, wherein the optimum luminance calculating circuit calculates the optimum luminance after the luminance of a cloudy sky area is weighted with a small value when the area size of the cloudy sky area in the object field is larger than a reference value.

25. An exposure control device according to claim 23, wherein the optimum luminance calculating circuit calculates the optimum luminance without regard to the luminance of a cloudy sky area when the area size of the cloudy sky area in the object field is not larger than a reference value.

26. An exposure control device according to claim 16, wherein each zone has spectral characteristics in the visible-light region and the infrared-light region.

* * * * *

UNITED STATES PATENT AND TRADEMARK OFFICE
CERTIFICATE OF CORRECTION

PATENT NO.     : 6,424,805 B2
DATED          : July 23, 2002
INVENTOR(S)    : Toshifumi Ohsawa It is certified that error appears in the above-identified patent and that said Letters Patent is hereby corrected as shown below:

Column 5,
Line 2, "posed a" should read -- posed of a --.

Column 10,
Line 11, "under a" should read -- under --.

Column 11,
Line 13, "greater" should read -- greater than --.

Column 14,
Line 11, "particular" should read -- a particular --.
Line 12, "when," should read -- when --.
Line 16, "particular" should read -- particular area --.
Line 63, "photosensor,;" should read -- photosensor, --.

Column 15,
Line 2, "cloud" should read -- cloudy --.
Line 39, "base" should read -- based --.
Line 48, "cloudy sky area" should read -- cloudy sky determining circuit --.

Signed and Sealed this

Fourth Day of March, 2003

JAMES E. ROGAN
*Director of the United States Patent and Trademark Office*